United States Patent
Duan

[11] Patent Number: 6,147,606
[45] Date of Patent: Nov. 14, 2000

[54] APPARATUS AND METHOD FOR RADIO FREQUENCY TRANSPONDER WITH IMPROVED READ DISTANCE

[75] Inventor: Dah-Weih Duan, Yorktown Heights, N.Y.

[73] Assignee: Intermec Ip Corp., Woodland Hills, Calif.

[21] Appl. No.: 09/277,271

[22] Filed: Mar. 26, 1999

Related U.S. Application Data

[60] Provisional application No. 60/079,391, Mar. 26, 1998.

[51] Int. Cl.[7] .................................................. G08B 13/14
[52] U.S. Cl. .................................. 340/572.7; 340/572.1; 343/852; 343/860; 343/873
[58] Field of Search .............................. 340/572.1, 572.4, 340/572.7, 825.54, 505; 342/51; 343/867, 742, 701, 818, 802, 852, 860, 873, 793, 855, 895

[56] References Cited

U.S. PATENT DOCUMENTS

| | | | |
|---|---|---|---|
| 5,305,008 | 4/1994 | Turner et al. | 342/44 |
| 5,317,330 | 5/1994 | Everett et al. | 343/867 |
| 5,495,250 | 2/1996 | Ghaem et al. | 342/51 |
| 5,682,143 | 10/1997 | Brady et al. | 340/572.1 |
| 5,719,586 | 2/1998 | Tuttle | 343/726 |
| 5,972,156 | 10/1999 | Brady et al. | 156/280 |
| 5,973,598 | 10/1999 | Beigel | 340/572.1 |
| 5,995,046 | 11/1999 | Belcher et al. | 342/450 |
| 5,995,048 | 11/1999 | Smithgall et al. | 343/700 MS |
| 6,013,949 | 1/2000 | Tuttle | 257/723 |
| 6,028,564 | 2/2000 | Duan et al. | 343/818 |

*Primary Examiner*—Daniel J. Wu
*Assistant Examiner*—Toan Pham
*Attorney, Agent, or Firm*—O'Melveny & Myers LLP

[57] ABSTRACT

A radio frequency identification transponder (RFID tag) in accordance with the principles of the present includes a tag antenna having a gain and an input impedance. The tag also includes RFID circuitry, which may be in the form of an RFID tag integrated circuit, the RFID circuitry also being characterized, in part, by an input impedance. According to the principles of the present invention the tag's read distance is maximized by tuning the tag antenna impedance and gain. In general, the imaginary part of the antenna impedance is chosen as the negative of the imaginary part of the RFID circuitry's impedance. Additionally, the real part of the tag antenna's impedance is selected by tuning those geometrical antenna parameters that affect both the antenna's gain and impedance. For RFID tags wherein the geometrical parameters of the tag antenna do not affect the gain $G_a$ of the tag antenna, the antenna input impedance may tuned to establish an antenna input impedance which is the complex conjugate of the RFID circuitry's input impedance.

16 Claims, 8 Drawing Sheets

APPARATUS AND METHOD FOR RADIO FREQUENCY TRANSPONDER WITH IMPROVED READ DISTANCE

CROSS-REFERENCE TO RELATED APPLICATIONS

This application claims the benefit of U.S. Provisional Application Ser. No. 60/079,391, filed Mar. 26, 1998, which application is specifically incorporated herein, in its entirety, by reference. Additionally, related U.S. patent applications assigned to the assignee of the present invention, entitled, "Radio Frequency Identification Transponder Having a Spiral Antenna", "Radio Frequency Identification Transponder Having a Helical Antenna", "RFID Transponder Having Improved RF Characteristics", "Distributed Impedance Matching Circuit For High Reflection Coefficient Load," and "Radio Frequency Identification Transponder Employing a Patch Antenna", filed on Nov. 13, 1998 are also hereby incorporated by reference.

FIELD OF THE INVENTION

The invention relates to radio frequency transponders, and, more particularly, to apparatus and method for improving the range of such transponders.

BACKGROUND OF THE INVENTION

Radio Frequency Identification (RFID) transponders (tags) are operated in conjunction with RFID base stations for a variety of inventory-control, security and other purposes. Typically an item having a tag associated with it, for example, a container with a tag placed inside it, is brought into a "read zone" established by the base station. The RFID base station generates a continuous wave electromagnetic disturbance at a carrier frequency. This disturbance is modulated to correspond to data that is to be communicated via the disturbance. The modulated disturbance, which carries information and may be sometimes referred to as a signal, communicates this information at a rate, referred to as the data rate, which is lower than the carrier frequency. The transmitted disturbance will be referred to hereinafter as a signal or field. The RFID base station transmits an interrogating RF signal which is modulated by a receiving tag in order to impart information stored within the tag to the signal. The receiving tag then transmits the modulated, answering, RF signal to the base station.

RFID tags may be active, containing their own RF transmitter, or passive, having no transmitter. Passive tags, i.e., tags that rely upon modulated back-scattering to provide a return link to an interrogating base station, may include their own power sources, such as a batteries, or they may be "field-powered", whereby they obtain their operating power by rectifying an interrogating RF signal that is transmitted by a base station. Although both types of tag have minimum RF field strength read requirements, or read thresholds, in general, a field-powered passive system requires at least an order of magnitude more power in the interrogating signal than a system that employs tags having their own power sources. Because the interrogating signal must provide power to a field-powered passive tag, the read threshold for a field-powered passive tag is typically substantially higher than for an active tag. However, because field-powered passive tags do not include their own power source, they may be substantially less expensive than active tags and because they have no battery to "run down", field-powered passive tags may be more reliable in the long term than active tags. And, finally, because they do not include a battery, field-powered passive tags are typically much more "environmentally-friendly".

Such RFID systems provide significant advantages over conventional identification systems, such as barcode identification systems, in the identification, tracking, and control of objects with which they are associated. RFID systems provide a rapid read rate, whereby a number of RFID transponders, or tags, may be quickly read rapidly, outside the line-of-sight of, and at some remove from an interrogating base station. Additionally, unlike bar codes or other write-once, read-many information storage systems, some RFID tags provide the ability of updating the information stored within the tag. Nevertheless, RFID systems would benefit from tags which are readable at as great a distance as possible. That is, in order to increase the operating distance of an RFID tag, one might operate at a lower carrier frequency. However, this may require a larger antenna and, therefore, a larger tag. In fact, the tag may be so big as to preclude its use in specific applications. Additionally, larger antennas may preclude the use of diversity schemes involving various positions, directions of propagation, signal polarization, and other techniques that may otherwise be employed to ensure a high "capture" or "read" rate at a given distance. Higher gain antennas may also be bulky and inconvenient for use in certain automatic identification applications. Although a brute-force approach, such as increasing the transmitting power may increase a tag's read distance, there are limits imposed, by governmental agencies for example, on the maximum radiated power permissible. An RFID tag that maximizes read distance for a given set of power and form-factor constraints would therefore be highly advantageous.

SUMMARY

A radio frequency identification transponder (RFID tag) in accordance with the principles of the present includes a tag antenna having a gain and an input impedance. The tag also includes RFID circuitry, which may be in the form of an RFID tag integrated circuit, the RFID circuitry also being characterized, in part, by an input impedance. According to the principles of the present invention the tag's read distance is maximized by tuning the tag antenna impedance and/or gain, given a load $Z_l$. That is, in an illustrative embodiment, the assumption is made that a load impedance, such as presented by an RFID tag integrated circuit, is fixed and the tag antenna impedance is adjusted to maximize the tag read distance for the prescribed load impedance. Tag antenna geometrical parameters may affect the impedance of the antenna, the gain of the antenna, or both. However, in general, the imaginary part of the antenna impedance is chosen as the negative of the imaginary part of the RFID circuitry's impedance. Additionally, the real part of the tag antenna's impedance is selected by adjusting the geometrical parameters of the antenna so that an antenna criterion, embodied in the following expression, is maximized:

$$[(Ra)(Ga)]^{1/2}/|Za+Zl|$$

where:
Ra=the real part of the antenna impedance, or radiation resistance
Ga=antenna gain
Za=antenna impedance
Zl=load, or RFID circuitry, impedance
|Za+Zl|=absolute value of (Za+Zl)

Maximization of this value may be accomplished by computing the value of the of the above equation for various values of each of the geometrical parameters which affect the antenna gain and impedance and selecting that set of values which maximizes the above expression For RFID tags wherein geometrical parameters of the tag antenna do not affect the gain Ga of the tag antenna, the antenna input impedance may be adjusted, using conventional trimming and tuning techniques, to establish an antenna input impedance which is the complex conjugate of the RFID circuitry's input impedance. That is, the antenna impedance Za is set to be the complex conjugate of Zl.

The new RFID tag is particularly suited for operation in RFID systems in which RFID tag size, and, consequently, antenna size is a critical issue. Additionally, the new tags enhance the operation of any RFID system in which RFID tags may be more readily read at a greater distance.

The RFID tag may employ any of a variety of antennas and impedance matching circuits. For example the impedance matching disclosed in "Distributed Impedance Matching Circuit For High Reflection Coefficient Load," which is incorporated by reference in this application may be employed to tune the antenna impedance according to the principles of the present invention. Consequently, when reference is made hereinafter, in the specification of in the claims to an RFID antenna, matching circuitry may be included.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

A radio frequency identification transponder (RFID tag) in accordance with the principles of the present includes a tag antenna characterized by a gain and an input impedance. The tag also includes RFID circuitry which also has an associated input impedance. According to the principles of the present invention, the tag's read distance is maximized by tuning the tag antenna impedance and gain so that, in general, the imaginary part of the antenna impedance is chosen as the negative of the imaginary part of the RFID circuitry's impedance. Additionally, the real part of the tag antenna's impedance is selected by adjusting the geometrical parameters so that an antenna criterion, embodied in the following expression, is maximized:

$$[(Ra)(Ga)]^{1/2}/|Za+Zl| \qquad (1)$$

where:
$R_a$=the real part of the antenna impedance, or radiation resistance
$G_a$=antenna gain
$Z_a$=antenna impedance
$Z_l$=load, or RFID circuitry, impedance
$|Za+Zl|$=absolute value of $(Z_a+Z_l)$ Maximization of this value may be accomplished by computing the value of the of the above equation for various values of each of the geometrical parameters which affect the antenna gain and impedance and selecting that set of values which maximizes the above expression.

For RFID tags wherein geometrical parameters of the tag antenna do not affect the gain $G_a$ of the tag antenna, the antenna input impedance the may be adjusted, using conventional trimming and tuning techniques, to establish an antenna input impedance which is the complex conjugate of the RFID circuitry's input impedance. That is, the antenna impedance $Z_a$ is set to be the complex conjugate of $Z_l$, denoted $Z_l^*$. In both cases, the real part of the impedances are chosen to be as small as possible.

Figures 1, 2:
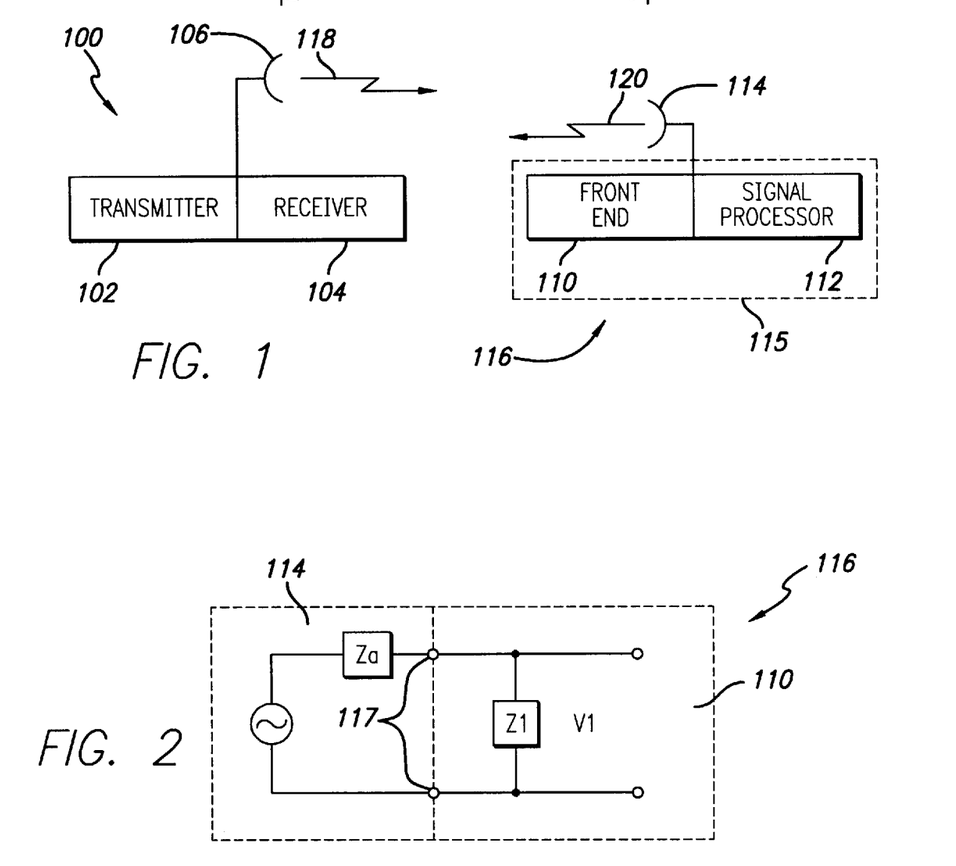
FIG. 1 is a conceptual block diagram of a radio frequency identification system in accordance with the principles of the present invention.
FIG. 2 is an equivalent circuit diagram of a radio frequency identification transponder (RFID tag) in accordance with the principles of the present invention.

An RFID system in accordance with the principles of the present invention is illustrated in the conceptual block diagram of FIG. 1. An RF base station 100 includes an RF transmitter 102, an RF receiver 104, and an antenna 106 connected to the transmitter 102 and receiver 104. An RF tag 116 such as may be used in conjunction with the base station 100 includes an RF front end 110, a signal processing section 112, and an antenna 114. In the illustrative embodiment, the RFID tag front end 110 and signal processor 112 are incorporated in a radio frequency identification transponder integrated circuit (RFIC) 115.

In operation, the base station 100 interrogates the tag 116 by generating an RF signal having a carrier frequency $F_c$. The carrier frequency $F_c$ is chosen based on a number of factors known in the art, including the amount power permitted at that frequency by FCC regulations. The RF signal is coupled to the antenna 106 and transmitted to the tag 116. The RF signal emitted by the antenna 106, will, ostensibly, be received by the tag antenna 114 and, if the RF signal's field strength meets a read threshold requirement, the RF tag will respond to the reception of the signal by modulating the RF carrier to impart information about the associated container onto the back-scattered RF field, which propagates to the base station 100. The RF signal transmitted by the base station 100 must have sufficient field strength, taking into account the polarization of the signal and of the tag's antenna, at the location of the tag 116 for the tag to detect the RF signal. In the case of a field-powered passive tag, the interrogating signal's field strength generally must be great enough for the tag 116 to rectify the signal and to use the signal's energy for the tag's power source. The signal transmitted by the base station may be referred to as the forward link 118 and the back-scattered signal as the return link 120. The forward link transmitted will have an incident field strength $E^i$ at the tag antenna.

The schematic block diagram of FIG. 2 illustrates an equivalent circuit model of the sources and loads associated with the new RFID tag 116. The antenna 114 is modeled as an open circuit voltage Voc in series with an antenna impedance $Z_a$. The tag front end 110, which may be embodied as a component of an RFID integrated circuit, is modeled as a load $Z_l$ imposed across the antenna terminals 117.

For a modulated back-scattering RFID system, the forward link read distance r may be related to the load voltage $V_l$ established at the RFID tag front end, as follows:

$$r = (1/k|V_l|)((2)(P_2)(R_a)(G_a)(G_1)(P_t))^{1/2}(|Z_l/(Z_a+Z_l)|) \quad (2)$$

where:
r=the RF tag read distance when only the forward link is considered
$k = 2\pi/\lambda$, where $\lambda$ is the carrier wavelength
$|V_l|$=absolute value of the minimum voltage required at the load (RF front end)
$P_2$=polarization matching factor for the tag antenna
$R_a$=tag antenna's radiation resistance i.e., $Z_a = R_a + jX_a$
$G_a$=tag antenna gain
$G_l$=base station antenna gain
$P_t$=total transmitted power
$Z_l$=load (front end) impedance
$Z_a$=tag antenna impedance When both the forward link and return link are considered, the read distance may be expressed as:

$$r = (1/(2k))(\gamma_2)(P_2)(G_a^2)(Q_1)(P_1)(G_1^2)(P_t/P_{min}))^{1/4} \quad (3)$$

Where:
r=RFID tag read distance
$k = 2\pi/\lambda$
$\gamma_2$=the re-radiating impedance matching factor for the tag
   =$|2Ra/(Za+Zl)|^2$
$P_2$=polarization matching factor for the tag
$G_2$=transponder antenna gain
$Q_1$=receiving impedance matching factor for the base station
$P_1$=polarization matching factor for the base station
$G_1$=base station antenna gain
$P_t$=total transmitted power from the base station
$P_{min}$=minimum back-scattered power required at the base station for a successful read The RFID tag read distance is determined by the lesser value of those obtained from equations 2 and 3. For most RFID tag systems, the read distance is limited by the value returned by equation 2, and such a limitation is addressed in accordance with the principles of the invention. That is, in accordance with the principles of the present invention, the read distance of an RFID tag is maximized by adjusting the geometrical parameters of the RFID tag antenna to maximize the value of the following expression:

$$r \text{ is proportional to } (RaGa)^{1/2}/|Za+Zl| \quad (4)$$

That is, because the other parameters are typically predetermined, e.g. load impedance $Z_l$ is given, by the input impedance of an RFID integrated circuit, for example, the quantity $G_1 P_t$ is pre-determined by Federal Communications Commission regulations, etc., or the other factors may be assigned values, the read range of the tag is proportional to the antenna gain, the antenna impedance, and the load impedance as described in expression (4). Consequently, by maximizing $(RaGa)^{1/2}/|Za+Zl|$, the read range is maximized for a given set of the other parameters. In the special case where the gain of the tag antenna is not affected by the geometrical parameters that also determine the impedance of the tag antenna, the expression simplifies to:

$$r \text{ is proportional to } Ra^{1/2}/|Za+Zl| \quad (5)$$

As a result, according to the principles of the invention, the read distance is maximized by setting Za equal to the complex conjugate of Zl, with the resulting expression:

$$r \text{ is proportional to } (Ra)^{1/2}/2Ra = (Rl)^{1/2}/2Rl = 1/(2Rl)^{1/2} \quad (6)$$

In accordance with expression 6, the read distance may be further enhanced by minimizing the load resistance Rl. This reduction in load resistance must be traded off against the need for a load impedance which establishes a discernable signal at the tag front end, though.

More generally, if the gain of the antenna tag, Ga, is a function of the same geometrical parameters which determine the impedance of the antenna, the tag antenna is tuned so that the imaginary part of its impedance is equal to the negative of the imaginary part of the load impedance and the real part, i.e., the tag antenna's radiation resistance is set at a value which provides a local maxima of expression 4. That is, in accordance with the principles of the invention, the antenna's geometrical parameters are selected to maximize expression 4. In one aspect of the invention, this selection process may be effected by computing and plotting a plurality of values of the expression for the various geometrical antenna parameters. This process is discussed in greater detail below in relation to the flow chart of FIG. 15. The RFID tag antenna may be any of a variety of types, including wire dipole, patch antenna, etc., particularly, but not limited to, the forms discussed in relation to the following figures.

Figure 3:
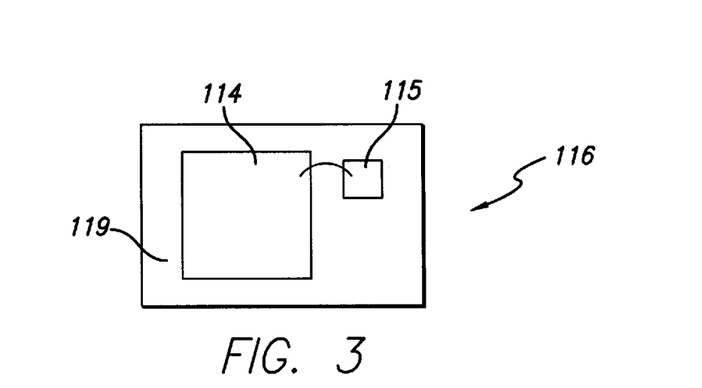
FIG. 3 is a top plan view of an RFID tag which employs a patch antenna, in accordance with the principles of the present invention.

The RFID tag 116 of FIG. 3 includes a patch antenna 114 electrically connected to an RFID integrated circuit 115. The antenna and RFID integrated circuit may be mounted using, for example, printed circuit board or hybrid circuit technology, on a substrate 119.

Figure 4:
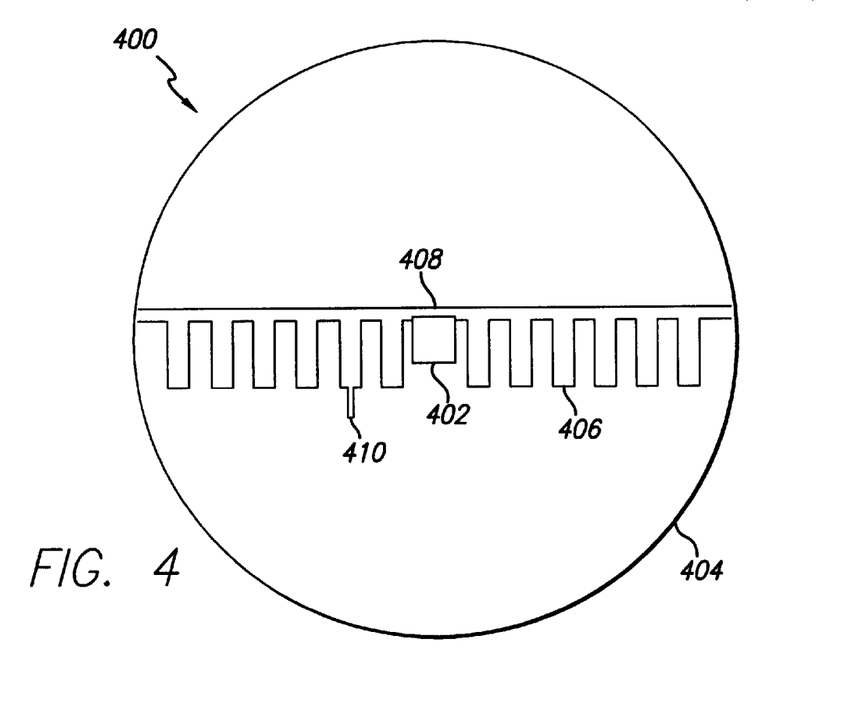
FIG. 4 is a top plan view of an exemplary RFID tag which employs RFID tag circuitry in the form of an RFID tag integrated circuit (IC) connected to a meander antenna.

Another RFID tag in accordance with the principles of the invention is illustrated in FIG. 4. The RFID tag 400 includes an RFID integrated circuit (IC) 402 that is affixed in a conventional manner to a substrate 404. A resonant wire dipole antenna 406 is connected to antenna terminals on the tag IC 402. The antenna 406 is referred to as a wire antenna to distinguish it from a patch antenna. The antenna 406 is not, however, a straight dipole antenna; it has a shape which permits it to fit within the limited space available within an RFID tag. Many variations of the antenna shape are possible, and a number of those variations are discussed in relation to the following figures. In each case the geometric parameters of the antennas are adjusted in accordance with the principles of the present invention to maximize the RFID tag read distance, as set forth above.

The antenna 406 may employ one or more loading bars, such as loading bar 408 and/or one or more tuning stubs, such as the tuning stub 410, to tune the IC/antenna to resonance at a preferred operational wavelength, is connected to antenna terminals on the tag IC 402. Although the illustrated antenna includes meanders that are rectangular, the meanders may be of any of a variety of shapes, including sinusoidal, clipped rectangular, and triangular. Tuning stubs, such as tuning stub 410 may be placed in any of a wide variety of locations along the antenna 406 and in any of a wide variety of orientations. The use of an antenna 406, such as a meander antenna, rather than a straight dipole antenna, permits the antenna 406 to be of a length which supports resonant operation. Consequently, the tag may be successfully read at a greater distance, sometimes as much as an order of magnitude greater, than a tag using a non-resonant antenna. If, for example, the RFID system employs a carrier frequency of 915 MHz, the corresponding signal wavelength would be approximately 32 cm and the half wavelength needed for resonant operation would be approximately 16 cm. This figure is only approximate, in part because the wavelength of interest is not the wavelength in free space, but the wavelength in the antenna material. In other words, the electrical length of the antenna, not the physical length of the antenna, should equal half the wavelength of the carrier frequency: 16 cm in this example. The read distance of the tag is further enhanced by tuning the impedance of the antenna in accordance with the principles of the present invention, as set forth above.

If the longest dimension of the tag 400, the diameter of the tag in this exemplary embodiment, is less than 16 cm, the meander configuration permits the inclusion of an antenna that has a total length equal to half a wavelength, for the illustrative carrier frequency. For example, if the diameter of the tag 400 is 100 mm and a meander antenna having an average of 10 mm per meander is employed, sixteen meanders, may be employed to provide the necessary antenna length. Similarly, a half wavelength of approximately 6 cm corresponds to a carrier frequency of 2.45 GHz and six meanders of 10 mm each would provide the length necessary for a resonant antenna at 2.45 GHz. However, if the meanders are placed too closely to one another, the antenna's performance will be severely degraded.

Figure 5:
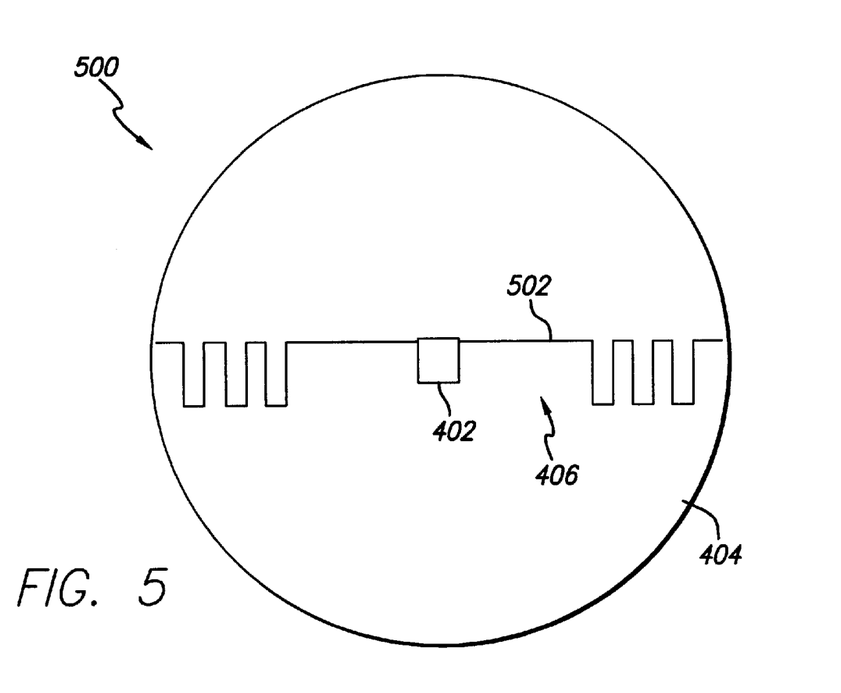
FIG. 5 is a top plan view of an illustrative embodiment of an RFID tag that employs a combination of a straight dipole and meander antennas.

In order to obtain optimal performance, the minimal meander required to provide a half wavelength antenna may be employed. The combination straight dipole/meander antenna of FIG. 5 provides the necessary antenna length without any unnecessary meander. The meander sections may be placed relatively close to the tag IC 402, or may be moved further toward the perimeter of the tag 500. The degree to which the antenna's length is devoted to straight dipole section and to meander sections may vary according to the intended application.

Figure 6:
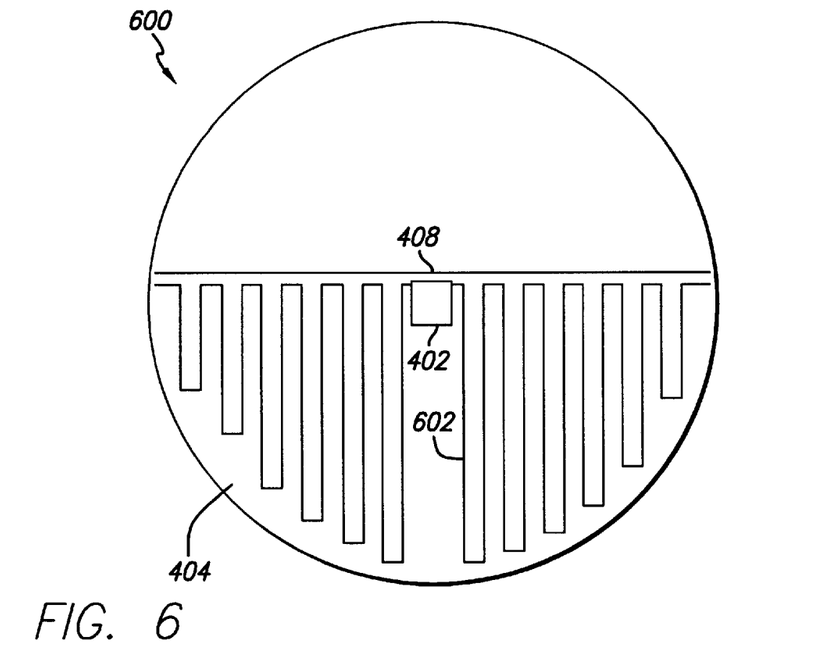
FIG. 6 is a top plan view of an illustrative embodiment of an RFID tag that includes a non-uniform meander antenna.

A tag IC 600 illustrated in the top plan view of FIG. 6 includes a non-uniform meander antenna 602. The non-uniform meander antenna 602, as with all the antennas set forth in this description may employ one or more loading bars, such as loading bar 408, and/or one or more tuning stubs, such as tuning stub 410 illustrated in FIG. 4. The non-uniform meander antenna 602 permit resonant operation in the relatively confined space of a small RFID tag 600. The non-uniform meander may better utilize the available space on a surface of the tag 600, thereby permitting the use of a smaller tag at a given carrier frequency.

Figure 7:
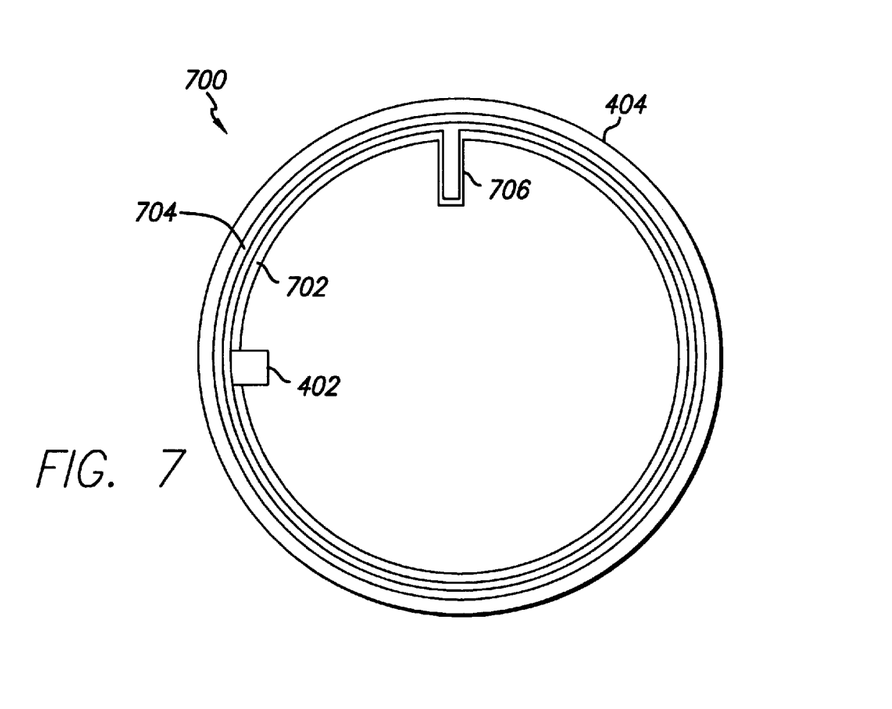
FIG. 7 is a top plan view of an illustrative embodiment of an RFID tag that employs a bent dipole antenna.

The RFID tag 700 of FIG. 7 employs a "bent dipole" antenna 702. The bent dipole avoids the interference problems associated with the meander antennas of previous figures yet provides the necessary antenna length to meet the desired half wavelength threshold. Typically, a bent dipole antenna 702 may be employed with a tag that provides more room than a tag such as might employ the meander or non-uniform meander tags previously described. A loading bar 704 and tuning stub 706 are also employed in this illustrative embodiment to tune the impedance of the antenna 702.

Figure 8:
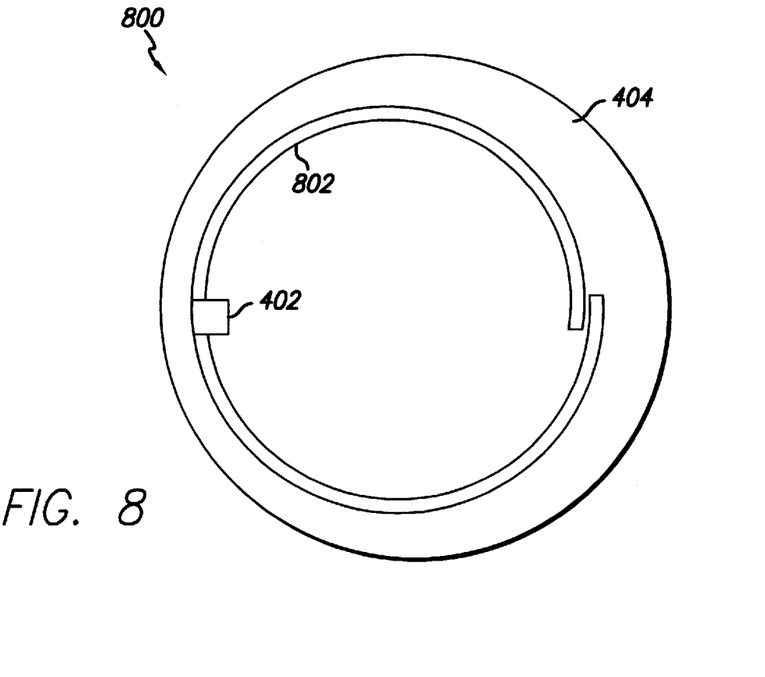
FIG. 8 is a top plan view of an illustrative embodiment of an RFID tag that employs spiral antennas.
Figure 9:
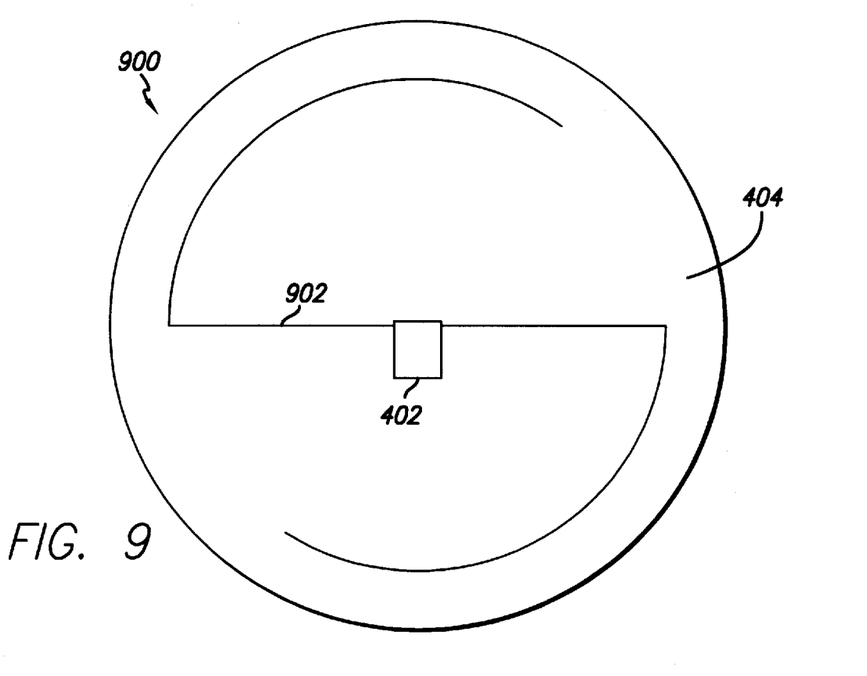
FIG. 9 is a top plan view of an illustrative embodiment of an RFID tag that employs a "z-shaped" antenna.
Figure 10:
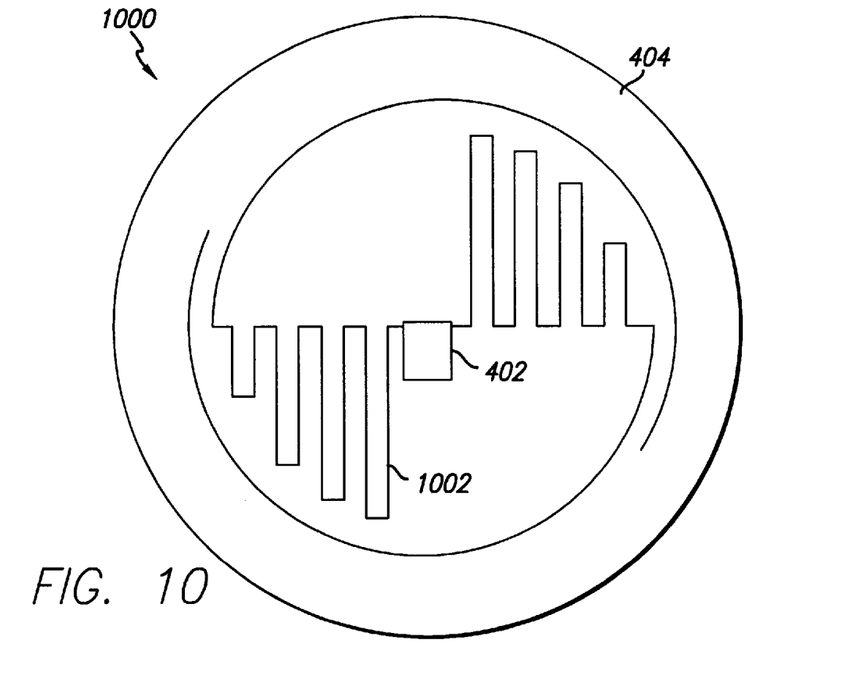
FIG. 10 is a top plan view of an illustrative embodiment of an RFID tag that employs an antenna which is a combination of spiral and non-uniform meander antennas.

A tag 800, illustrated in the top plan view of FIG. 8 employs a spiral antenna 802, which may be an Archimedes spiral, for example. The spiral type antenna provides flexibility in tuning the impedance of the antenna, as well as providing flexibility in obtaining circular polarization, when desired. As with the previous examples, the antenna 802 provides sufficient antenna length in the confined space available from an RFID tag 800. Similarly, a somewhat Z-shaped antenna 902 is employed by an RFID tag 900 of FIG. 9 to provide sufficient antenna length in a confined space. Generally, tags that employ antennas having a straight dipole in combination with other forms of antenna, such as, a bent dipole, a meander, spiral or other type, situate the straight dipole section of the antenna closest to the tag IC 402 in order to maximize performance. Additionally, the curved, meandered, or other sections are generally kept to a minimum, in order enhance performance.

Figure 11:
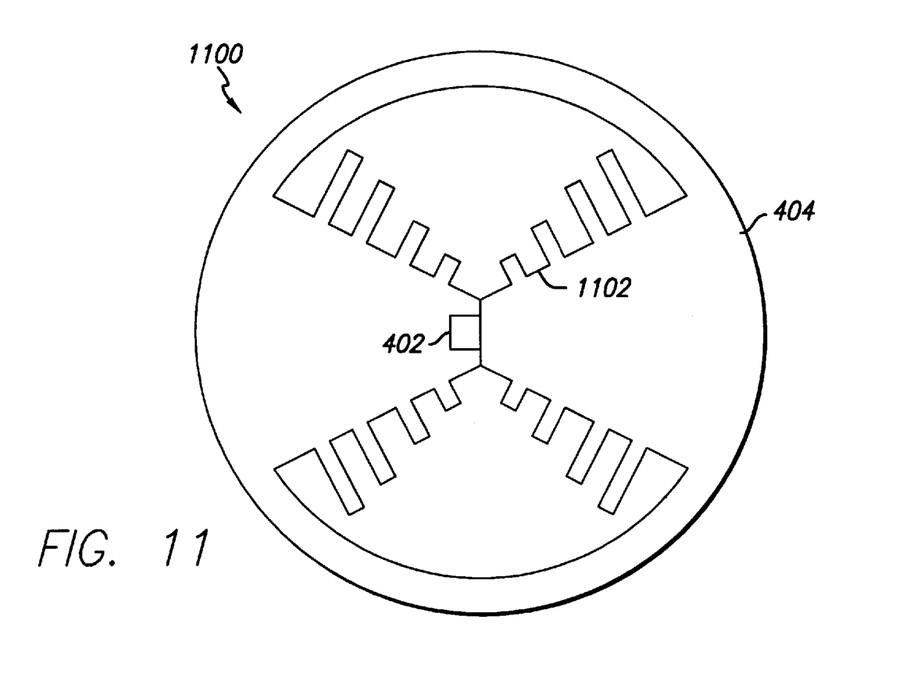
FIG. 11 is a top plan view of an illustrative embodiment of an RFID tag that employs an antenna that is a combination of a non-uniform meander and pinched dipole antennas.
Figure 12:
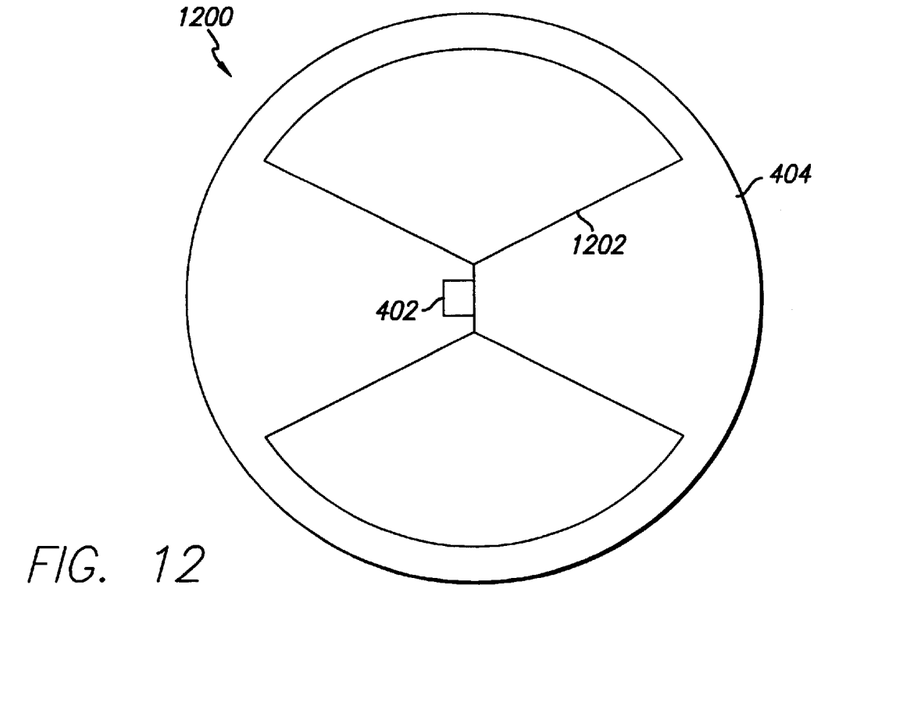
FIG. 12 is a top plan view of an illustrative embodiment of an RFID tag that employs a pinched dipole antenna.
Figure 13:
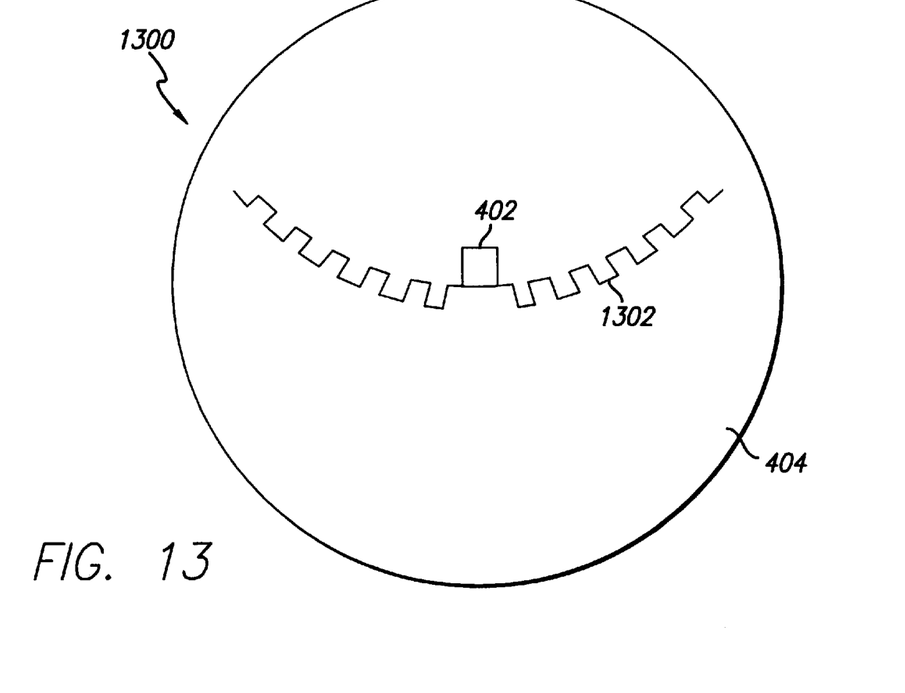
FIG. 13 is a top plan view of an illustrative embodiment of an RFID tag that employs bent meander antenna.

Combinations of the basic antenna shapes set forth above may be employed to optimize performance, cost, and other design factors. As an example, the antenna 1000 is a combination of the non-uniform meander and spiral antennas described above and the antenna 1102 of FIG. 11 is a combination of a "pinched dipole" antenna and a non-uniform meander antenna. The RFID tag 1200 of FIG. 12 employs a pinched dipole antenna 1202 and the RFID tag 1300 of FIG. 13 employs a bent meander antenna 1302.

Any of the antenna configurations discussed above may be used in cooperation with a ground plane located on the opposite side of the substrate 404. A plurality of antennas, may be combined on the same substrate to provide circular or dual linear antennas with wider bandwidths than a single antenna may be able to provide. Additionally, the wire antennas may be replace by their slot counterparts, whereby an antenna wire is replaced by a slot in a conductive surface, such as a metallized surface. In such a case, the slot may be "backed up" by a ground plane or cavity for improved gain and bandwidth performance.

Figure 14:
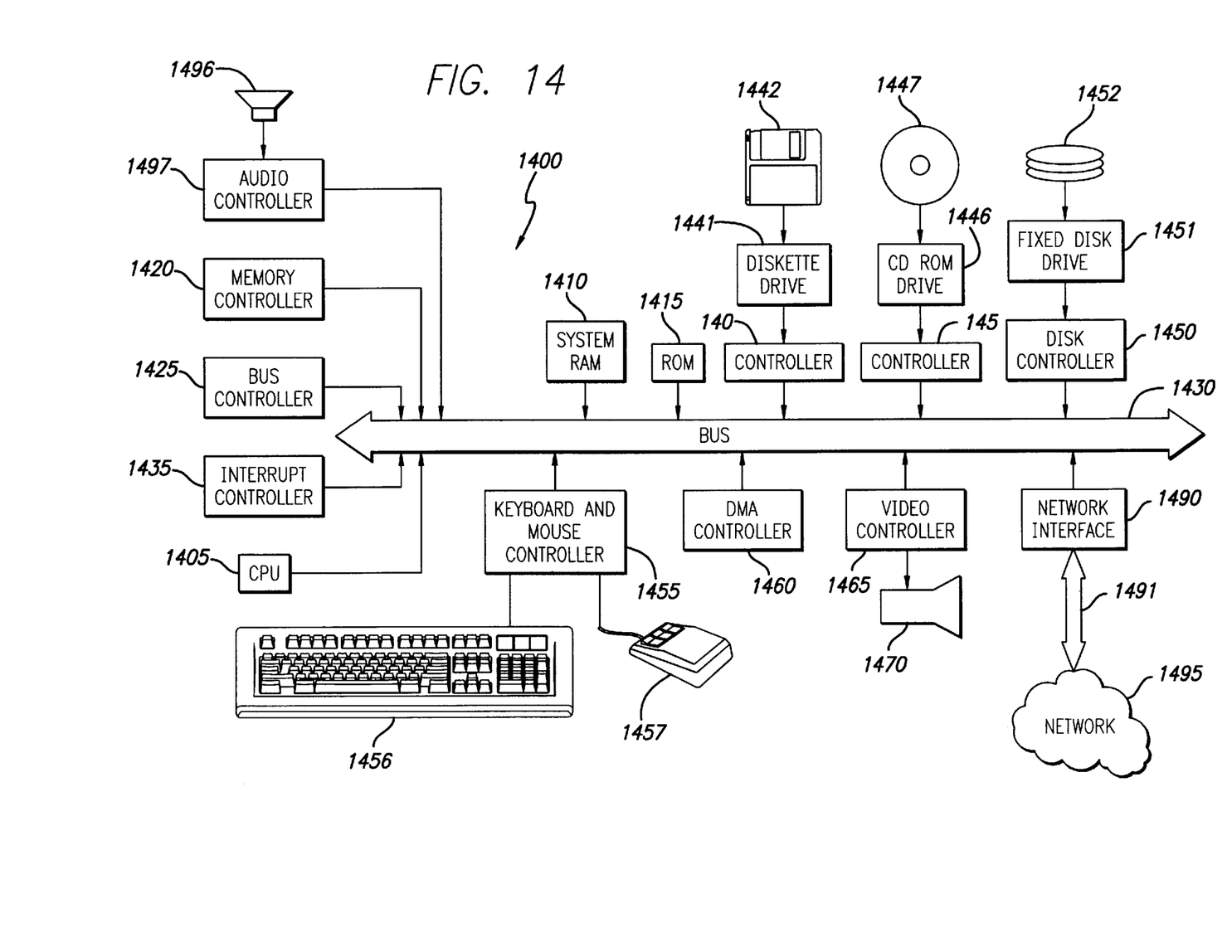
FIG. 14 is a block diagram of an illustrative computer system on which the method of selecting the impedance of a tag antenna according to the present invention may be implemented.

In a case where the geometric parameters of the antenna affect the antenna gain, the process of selecting the geometric parameters may effected employing a computer, such as that in FIG. 14 which illustrates the system architecture for a computer system 1400 such as an IBM PS/2®, on which the inventive geometrical parameter selection method may be implemented. The exemplary computer system of FIG. 14 is for descriptive purposes only. Although the description may refer to terms commonly used in describing particular computer systems, such as in IBM PS/2 computer, the description and concepts equally apply to other systems, including systems having architectures dissimilar to FIG. 14.

Computer system 1400 includes a central processing unit (CPU) 1405, which may be implemented with a conventional microprocessor, a random access memory (RAM) 1410 for temporary storage of information, and a read only memory (ROM) 1415 for permanent storage of information. A memory controller 1420 is provided for controlling RAM 1410.

A bus 1430 interconnects the components of computer system 1400. A bus controller 1425 is provided for controlling bus 1430. An interrupt controller 1435 is used for receiving and processing various interrupt signals from the system components.

Mass storage may be provided by diskette 1442, CD ROM 1447, or hard drive 1452. Data and software may be exchanged with computer system 1400 via removable media such as diskette 1442 and CD ROM 1447. Diskette 1442 is insertable into diskette drive 1441 which is, in turn, connected to bus 1430 by a controller 1440. Similarly, CD ROM 1447 is insertable into CD ROM drive 1446 which is, in turn, connected to bus 1430 by controller 1445. Hard disc 1452 is part of a fixed disc drive 1451 which is connected to bus 1430 by controller 1450.

User input to computer system 1400 may be provided by a number of devices. For example, a keyboard 1456 and mouse 1457 are connected to bus 1430 by controller 1455. An audio transducer 1496, which may act as both a microphone and a speaker, is connected to bus 1430 by audio controller 1497, as illustrated. It will be obvious to those reasonably skilled in the art that other input devices, such as a pen and/or tabloid may be connected to bus 1430 and an appropriate controller and software, as required. DMA controller 1460 is provided for performing direct memory access to RAM 1410. A visual display is generated by video controller 1465 which controls video display 1470. Computer system 1400 also includes a communications adaptor 1490 which allows the system to be interconnected to a local area network (LAN) or a wide area network (WAN), schematically illustrated by bus 1491 and network 1495.

Operation of computer system 1400 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among things. In particular, an operating system resident in system memory and running on CPU 1405 coordinates the operation of the other elements of computer system 1400. The present invention may be implemented with any number of commercially available operating systems including OS/2, UNIX and DOS, etc. One or more applications, such as Lotus NOTES™, commercially available from Lotus Development Corp., Cambridge, Mass. may also run on the CPU 1405. If the operating system is a true multitasking operating system, such as OS/2, multiple applications may execute simultaneously.

Figure 15:
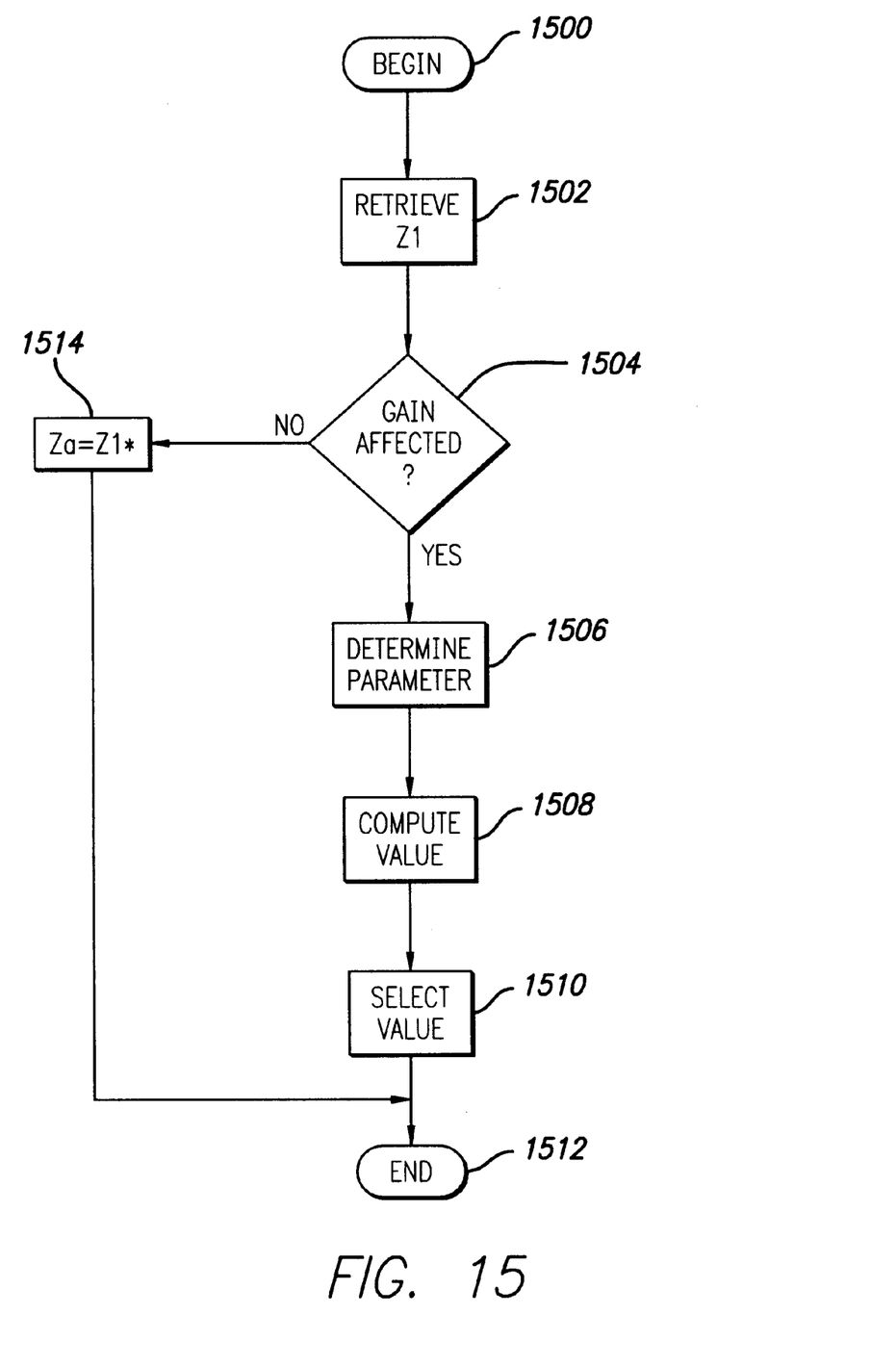
FIG. 15 is a flow chart illustrating the steps in selecting the values of an RFID tag antenna's impedance in accordance with the principles of the present invention.

The flow chart of FIG. 15 illustrates the selection procedure for determining the appropriate, maximizing, antenna impedance Za for an RFID tag in accordance with the principles of the invention. The process begins in step 1500 and proceeds to step 1502 where the value of the load impedance, Zl is retrieved, either from storage or from an input device, such as the keyboard 1456. The process proceeds from step 1502 to step 1504, where it is determined whether the gain of the antenna Ga is affected by any of the geometrical parameters which affect the impedance of the antenna Za. If the gain is affected by one of these parameters the process proceeds to step 1506 where the particular geometrical parameters, such as length of a dipole antenna, the spiral constant, that is, the tightness, of an Archimedian spiral, etc., which affect both the gain and the impedance of the antenna are determined. From step 1506 the process proceeds to step 1508, where a plurality of values for expression (4) are computed, varying each of the parameters which affect both the gain and impedance of the antenna. From step 1508 the process proceeds to step 1510 where the values of the antenna's geometrical parameters which provide local maxima for expression (4) are selected for the implementation of the antenna. This selection step could, for example, involve plotting the various values of expression (4), with one of the parameters varied for each plot, and visually selecting the parameter values which provide the greatest overall read distance. After selecting the geometrical values in this manner, the process proceeds to end in step 1512. If, in step 1504, it is determined that the gain of the antenna is not affected by the same geometrical parameters which affect the antenna impedance, the process proceeds to step 1514, where the geometrical antenna parameters are selected so as to set the impedance of the antenna equal to the complex conjugate of the load, or front end, impedance. From step 1514, the process proceeds to end in step 1512.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A radio frequency identification transponder (RFID tag) comprising:
a tag antenna having a gain $G_a$ and an impedance $Z_a$; and radio frequency identification circuitry responsive to electromagnetic signals received at the tag antenna, the circuitry having an input impedance $Z_l$ the antenna having geometric characteristics, the gain and the impedance of the antenna being a function of the geometric characteristics, the geometric characteristics of the antenna being tuned to maximize the value of $[(Ra)(Ga)]^{1/2}/|Za+Zl|$.

2. The RFID tag of claim 1 wherein the imaginary part of the antenna impedance is the negative of the imaginary part of the load impedance.

3. The RFID tag of claim 2 wherein the load impedance is minimized.

4. The RFID tag of claim 1 wherein the geometric parameters of the antenna which affect the antenna impedance have a negligible effect for a particular application on the antenna gain and the antenna impedance $Z_a$ is the complex conjugate of the load impedance $Z_l$.

5. The RFID tag of claim 4 wherein the geometric parameters of the antenna establish a real part of the antenna impedance which maximizes the expression $[(Ra)(Ga)]^{1/2}/|Za+Zl|$.

6. The RFID tag of claim 4 wherein the negligible effect is less than or equal to five percent of the antenna gain.

7. An RFID system comprising:
a base station; and
an RFID tag, the tag including;
a tag antenna having a gain $G_a$ and an impedance $Z_a$; and radio frequency identification circuitry responsive to electromagnetic signals received at the tag antenna, the circuitry having an input impedance $Z_l$, the antenna having geometric characteristics, the gain and the impedance of the antenna being a function of the geometric characteristics, the geometric characteristics of the antenna maximizing the value of $[(Ra)(Ga)]^{1/2}/|Za+Zl|$.

8. The RFID system of claim 6 wherein the imaginary part of the antenna impedance is the negative of the imaginary part of the load impedance.

9. The RFID tag of claim 8 wherein the load impedance is minimized.

10. The RFID system of claim 9 wherein the geometric parameters of the antenna establish a real part of the antenna impedance which maximizes the expression $[(Ra)(Ga)]^{1/2}/|Za+Zl|$.

11. The RFID tag of claim 7 herein the geometric parameters of the antenna which affect the antenna impedance have a negligible effect for a particular application on the antenna gain and the antenna impedance $Z_a$ is the complex conjugate of the load impedance $Z_l$.

12. A method of maximizing an RFID tag read range, the tag including an antenna having a gain $G_a$ and an impedance $Z_a$, the gain and the impedance of the antenna being a function of geometric characteristics of the antenna, and a load having an input impedance $Z_l$, comprising the steps of:

determining the impedance $Z_l$ of the load; and tuning the geometric characteristics of the antenna to maximize the value of $[(Ra)(Ga)]^{1/2}/|Za+Zl|$.

13. The method of claim 12 wherein the antenna impedance is tuned such that the imaginary part of the antenna impedance is the negative of the imaginary part of the load impedance.

14. The method of claim 12 wherein the geometric parameters of the antenna which affect the antenna impedance have a negligible effect for a particular application on the antenna gain and the antenna impedance $Z_a$ is tuned to be the complex conjugate of the load impedance $Z_l$.

15. The method of claim 12 wherein the load impedance is minimized.

16. The method of claim 15 wherein the geometric parameters of the antenna are tuned to establish a real part of the antenna impedance which maximizes the expression $[(Ra)(Ga)]^{1/2}/|Za+Zl|$.

* * * * *